United States Patent [19]
Dryden

[11] 3,752,186
[45] Aug. 14, 1973

[54] VENTING DEVICE AND METHOD FOR ANESTHETIC ADMINISTRATION

[75] Inventor: Gale E. Dryden, Indianapolis, Ind.

[73] Assignee: Dryden Corporation, Indianapolis, Ind.

[22] Filed: Oct. 9, 1970

[21] Appl. No.: 79,595

[52] U.S. Cl. ................................ 137/608, 251/310
[51] Int. Cl. ............................................. F17d 1/00
[58] Field of Search ...................... 137/608, 625.47; 251/310, 311

[56] References Cited
UNITED STATES PATENTS

| | | | |
|---|---|---|---|
| 3,542,336 | 11/1970 | Giese | 251/310 X |
| 1,504,498 | 8/1924 | Petcher | 251/311 X |
| 2,832,562 | 4/1958 | Myers | 251/310 X |
| 3,110,322 | 11/1963 | Bozoyan | 251/311 X |
| 2,996,083 | 8/1961 | Huska | 137/625.47 X |
| 1,088,817 | 3/1914 | Graham | 137/610 X |
| 2,434,215 | 1/1948 | Mayer | 138/43 X |
| 2,632,467 | 3/1953 | Lamar | 137/625.47 X |
| 2,854,027 | 9/1958 | Kaiser et al. | 137/625.47 X |
| 3,185,179 | 5/1965 | Harautuneian | 137/625.47 |
| 3,572,385 | 3/1971 | Acosta | 137/625.47 |
| 3,575,210 | 4/1971 | Fussell | 137/608 |
| 3,582,090 | 6/1971 | Lott et al. | 137/608 |

*Primary Examiner*—Samuel Scott
*Attorney*—Woodard, Weikart, Emhardt and Naughton

[57] ABSTRACT

A valve assembly in a circle absorber system includes a removable plug to permit limited escape of gases from the absorber system, and a manually adjustable body accommodating escape of additional volumes of gas as determined by adjustable registry of vent openings therein. A valve assembly cover is provided with a fitting connectible to a vacuum system to facilitate disposition of vented gases outside of the operating room environment.

7 Claims, 5 Drawing Figures

Patented Aug. 14, 1973

INVENTOR
GALE E. DRYDEN

BY
Woodard Weikart Emhardt & Naughton
ATTORNEYS

Patented Aug. 14, 1973

INVENTOR
GALE E. DRYDEN
BY
Woodard Weikart Emhardt & Naughton
ATTORNEYS 3,752,186

VENTING DEVICE AND METHOD FOR ANESTHETIC ADMINISTRATION

BACKGROUND OF THE INVENTION

1. Field of the Invention

This invention relates generally to administration of anesthetics, and more particularly to means for controlling release of gases from a circle absorber system during anesthesia.

2. Description of the Prior Art

Known prior art typically employs a gas machine of conventional construction equipped to deliver gaseous inhalant mixtures of oxygen and/or air mixed with suitable anesthetic gases. Suitable manually controlled valving is provided on such machines so that the volume of gases consumed by the patient and extracted in the absorber are replaced by delivery of gas to maintain the average volume of the system substantually at equilibrium. The depth of anesthesia is controlled by regulating the concentration of the anesthetic gas in the mixture delivered to the breathing circuit. The machines may be arranged to respond to pressure for increasing or decreasing the volume of gas delivered to the circuit. It is also possible to provide a pressure gauge or manometer for observation by the anesthetist to enable him to observe and maintain pressure by the desired adjustments. Pressure relief valves are also employed to avoid excessive pressures in such systems.

The technique of anesthetists varies somewhat. Some prefer to add approximately 3 to 4 litres of mixture per minute, while others may use up to 8 litres per minute. High rates of supply to the circuit by the gas machine usually exceed the volume consumed by the patient and extracted in the absorber, so there must be a regular and constant venting of gases. While a certain amount of this is tolerable, there is some disadvantage to venting any amount of anesthetic mixture or the breathing mixture into the operating room atmosphere. Certainly the venting of large amounts is quite objectionable because of the obvious anesthetic effect it may have on operating personnel.

SUMMARY OF THE INVENTION

Described briefly, in a typical embodiment of the present invention, a disposable valve is provided with a feature accommodating low venting rates while permitting assistance to the breathing of the patient by the usual techniques. It includes a manually adjustable feature to accommodate venting at high rates, and includes means for collecting the vented gas to avoid dissipation thereof in an operating room.

DESCRIPTION OF THE PREFERRED EMBODIMENT

Figure 1:
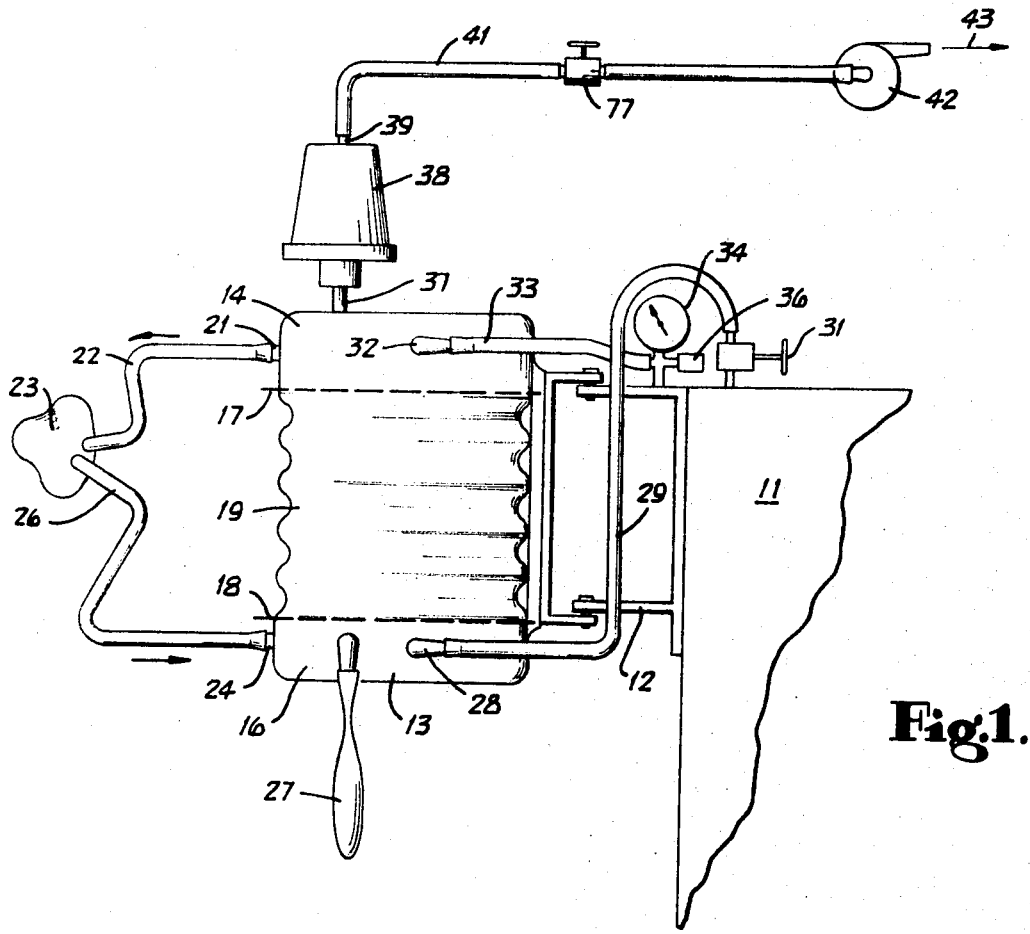
FIG. 1 is an elevational view of a circle absorber system incorporating the present invention.

Referring now to the drawings in detail, a conventional anesthetic gas machine 11 is provided with a bracket 12 on which is mounted a unitary disposable cannister assembly 13 which may be of a type shown and described in my application Ser. No. 684,005, now U.S. Pat. No. 3,566,867, Mar. 2, 1971, filed Nov. 17, 1967. In brief, such an assembly includes an upper chamber 14, a lower chamber 16, and an intermediate chamber between the lines 17 and 18, with the latter chamber 19 containing soda-lime, or other suitable absorbent material for carbon dioxide. A one-way valve in a fitting 21 permits flow of the breathing mixture from the chamber at 14 through the hose 22 to the mask 23. A one-way valve in the fitting 24 permits flow of gas through the hose 26 into the lower chamber 16. A re-breathing bag 27 is mounted to the lower chamber, and a fitting 28 is provided to receive the anesthetic gas mixture through a hose 29 from a manually controllable valve 31 on the gas machine 11.

A fitting 32 on the upper chamber is connected through a hose 33 to a pressure gauge 34 and pressure release valve 36.

According to a feature of the present invention, an additional fitting 37 is provided on the cannister and serves as a base for the valve assembly 38 which has a fitting 39 at the upper end or at the base thereof. A hose 41 from this fitting is connected to a vacuum system or pump 42 of the hospital or clinic employing the equipment, for removal of vented gases from the valve assembly 38 and from the operating room to discharge outside the building at 43, for example. Of course, it will be recognized that the length of the hose 41 or the other appropriate vacuum line which it may represent, would be much longer in practice than is represented in the drawing, where the length is reduced to conserve space.

Figure 2:
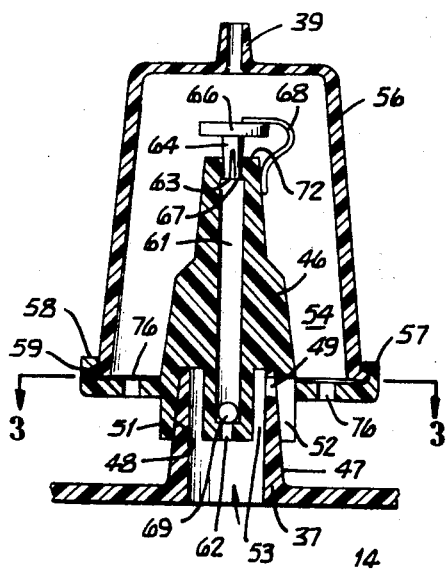
FIG. 2 is an enlarged longitudinal section through a typical embodiment of a valve constructed according to the present invention.
Figure 3:
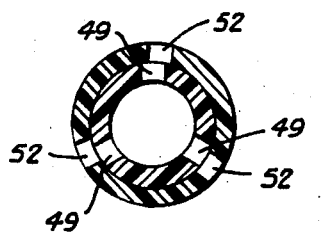
FIG. 3 is a section taken at line 3—3 in FIG. 2 and viewed in the direction of the arrows, showing the valve adjusted for a high venting rate.
Figure 4:
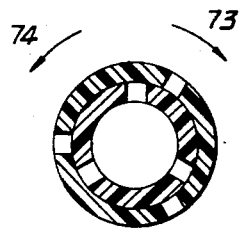
FIG. 4 is a section like FIG. 3, but showing a portion of the valve closed for low venting rates.

Referring particularly to FIGS. 2, 3 and 4, the fitting 37 of FIG. 1 serves as a mounting base for a valve body 46, the outer surface 47 of the fitting 37 being generally cylindrical, although it may have a slight taper to facilitate molding in plastic and assembly of the parts. The valve body 46 has a generally cylindrical inner surface 48 received on the surface 47, and this surface also may have a slight taper to facilitate molding and assembly of the parts. As shown better in FIGS. 3 and 4, the upper margin of the fitting 37 may have a plurality of slots 49 therein. Similarly, the lower margin of the skirt portion 51 of the valve body, and which has the inner surface 48 perceived on the fitting 37, may have a plurality of circularly spaced slots 52 therein. As shown in FIGS. 2 and 3, the slots 52 are in registry with the slots 49. In this condition of the parts, gases in the system may escape through fitting 37 and may pass upwardly through the annular space 53 and slots 49 and 52 into the chamber 54 provided by a cover 56 which is received in the flanged portion 57 of the valve body. A suitable bead may be provided at 58 on the flange and at 59 on the cover to permit a snap-in construction.

The valve body has a central passageway 61 having an aperture 62 at the lower end thereof and an aperture 63 at the upper end thereof. The aperture 63 may be partially closed by a tapered pin 64 having a knob 66 at the upper end thereof, and having a vertically extending slot 67 extending upwardly therein from the lower end of the pin. The pin 64 can be pushed further down into the aperture 63 to completely close the upper opening of the passageway 61, or it can be completely removed from the opening, and will be retained by the flexible link 68 to prevent inadvertent loss.

A ball 69 is provided in the passageway, and is free to move from the position shown where it closes the aperture 62 at the lower end, to a position against the lower end of the pin 64 when it is in the upper aperture, or the ball can close the upper aperture in the event the pin is removed therefrom, and gas flow upwardly through the passageway moves the ball against the upper end thereof.

In the use of the apparatus thus far described, according to the method of the present invention, if it is desired to operate the absorber system completely closed, the plug pin 64 will be pushed down into the aperture 63 to the extent such that the slot 67 is completely closed or completely below the upper margin 72 of the valve body. Likewise, the valve body will be turned with respect to the fitting 37 in the direction of arrow 73 or 74 to such an extent that, as shown in FIG. 4, there is no registry between the slots thereof and those in the fitting. With this arrangement, there is no possibility of gas from the chamber 14 being vented through any portion of the assembly 38.

If it is desired to use the apparatus at low venting rates, the cover 56 can be removed and the pin 64 pulled slightly upward in the aperture 63. Operation would then continue with an appropriate adjustment of the pin 64 to accommodate the volume of gas supplied from the machine 11 through the hose 29, without undesired rise of pressure indicated by gauge 34. The amount of exposure of the slot 67 will determine the amount of gas vented. In this condition, the ball 69 can move upwardly in the passageway to whatever extent the volume of venting gas through the passageway 61 will lift it. However, in the event the anesthetist squeezes the re-breathing bag 27, for example, to aid the patient in breathing, the ball will close against the seat at the lower end of the upper aperture, and prevent venting under such circumstances. Thus the valve remains compatible with conventional techniques.

In the event the amount of gases to be vented requires complete removal of the pin 64, it will remain hanging beside the valve body by means of the strap 68, which may be simply a molded plastic strap adhered to the knob 66 and to some part of the assembly such as the valve body or cover for example. If additional venting is needed to avoid seating of the ball 69, on the lower edge of the upper aperture, 63, the valve body 46 can be turned to permit some registry of the openings 49 and 52. In this way, in addition to the gas vented through the aperture 62, passageway 61 and aperture 63, additional gases from the system may be vented through the openings in the base fitting 37 and the valve body skirt. With the cover removed, these gases will simply dissipate into the operating room atmosphere. As the volume and duration of such venting increase, it can have adverse effects on the personnel therein. To avoid this, the 56 may simply be snapped into place, and the vented gases therefrom exhausted by the vacuum system 41–42 of FIG. 1, for example.

In order to avoid excessive evacuation due to the connection of the vacuum system to the cover 56, additional vents 76 may be provided in the flange 57, for example, to permit air from the atmosphere to be drawn up into the cover and out the fitting 39. Also, of course, it is possible to provide a valve in the vacuum line as at 77, for example, or to reduce the area of registry of openings 49 and 52.

The sizing of the various components may be such that, for example, various adjustments of the pin 64 will suffice, while the openings 49–52 remain closed, for flow rates up to 4 litres. Removal of pin 64 and increases of opening of valve body vents may be employed for increasing flow rates above 4 litres per minute.

Figure 5:
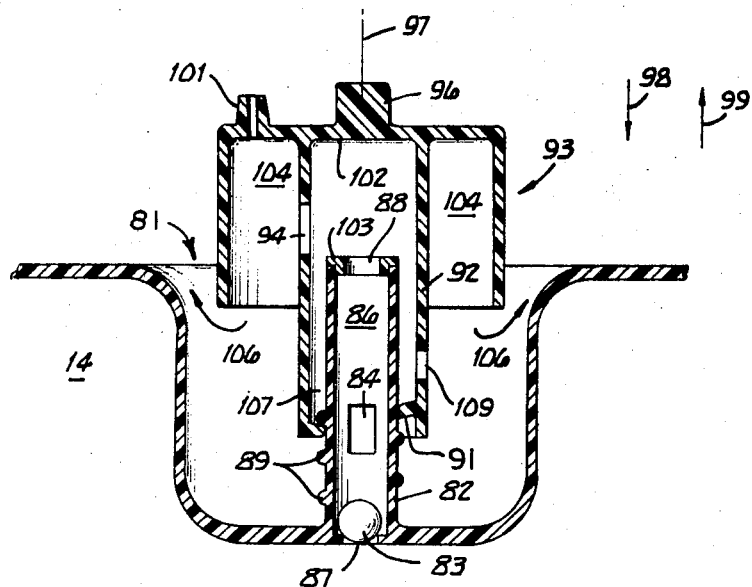
FIG. 5 is a section through an alternate embodiment of the invention.

Referring now to FIG. 5, there is shown a recess 81 in the top of the canister and which projects partially into the chamber 14. Projecting upwardly from the bottom of this recess is a cylinder 82 which receives the valve ball 83 in the same manner as the passageway 61 received the valve ball 69. An aperture 84 is provided in the wall of the internal passageway 86 in cylinder 82. The ball can thus move between a position covering the lower aperture 87 and a position covering the upper aperture 88 in the passageway 86.

The cylinder 82 has a screw thread 89 molded on the exterior surface thereof which receives the single turn of thread 91 molded on the internal cylindrical wall 92 of the cover member 93. This wall 92 has an aperture therein at 94. A tab 96 is provided on the upper end to facilitate turning the cover 93 about the axis 97 to thread it down into the recess in the direction of arrow 98 or upwardly in the direction of arrow 99. A fitting 101 is provided at the upper end of the cover for the same purpose as described above with reference to the previously described embodiment.

In the use of the embodiment of FIG. 5, the recessed construction serves to conserve space during shipment. In this event, the cover 93 is turned completely down into the recess. For use of the device with the cover completely turned down, the underside thereof at 102 seats on the upper end gasket 103 of the cylinder 82 for a completely closed system. To permit venting of gas from the chamber 14, the thumb grip 96 is gripped between the thumb and forefinger, and the cover is turned counterclockwise (looking down upon the unit) which starts it moving upwardly in the direction of arrow 99. The initial upward movement thereof, of course, opens the aperture 88 and permits venting of gas through the aperture 87 up the passageway 86 through aperture 88 and out through aperture 94 to the space 104 under the cover, from which it can move out in the direction of arrow 106 into the atmosphere of the operating room. As the cover is further raised by further rotation thereof on the member 82, the size of the passageway for venting of gases increases. At some point, the flow upward through the passageway 86 may be such as to seat the ball 83 on the lower edge of the upper aperture 88, whereupon further venting will take place through the aperture 84 in the wall 82 and up in the space 107 between cylinder 82 and cylinder 108 and out the vent 94. Also, as with the previously described embodiment, a slot can be provided in the lower margin of the cylinder 108 as indicated at 109 to permit registry thereof with the opening 84 and permit direct venting through the registry openings to the areas under the cover. The evacuation of the area under the cover can be accomplished by connecting a vacuum system hose to the fitting 101 as described above with reference to the other embodiment of the invention.

In the construction of both embodiments of the present invention, all parts can be made of molded plastic. If desired, the ball can be a steel ball of the type conventionally used in ball bearings. The gasket employed in the embodiment of FIG. 5 can be of a soft plastic or rubber or other suitable material. While materials other than plastics may be employed, it seems that plastics will be most suitable, and of course, lend themselves to transparent construction which can be desirable particulary from the standpoint of general appearance, and the ability to thereby see the position of the ball in the passageway in the pop-off valve.

Although the top of the cannister is a convenient site for the valve assemblies of the present invention, their construction adapts them to convenient mounting at other locations on a circle absorber system, if desired.

The invention claimed is:

1. A valve assembly comprising:
a mount having a first generally cylindrical wall surface with first opening means therein,
a body having a second generally cylindrical wall surface thereon received around said first wall surface, said second wall surface having second opening means therein, said body being fitted on said mount and manually rotatable on colinear axes of said generally cylindrical surfaces for varying degrees of registry between the said first and second opening means, the said first opening means of said mount communicating with a first chamber to be vented,
said body having cover receiver means thereon,
said generally cylindrical wall surfaces being slightly tapered and disposed in facing rotatably sliding relationships whereby said body is supported on said mount,
an internal elongated passageway in said body, said passageway having an aperture in each end;
a valve movable longitudinally in said passageway and capable of positioning at said end apertures alternately, and capable of closing one of said apertures.

2. The assembly of claim 1 wherein said valve is a ball and said body is transparent for visibility of said ball therein.

3. The assembly of claim 1 wherein:
said body has a cap thereon with a stem projecting through one of said apertures into said passageway.

4. A valve assembly comprising:
a mount having a first generally cylindrical wall surface with first opening means therein,
a body having a second generally cylindrical wall surface thereon received around said first wall surface, said second wall surface having second opening means therein, said body being fitted on said mount and manually rotatable on colinear axes of said generally cylindrical surfaces for varying degrees of registry between the said first and second opening means, the said first opening means of said mount communicating with a first chamber to be vented,
said body having cover receiver means thereon,
said generally cylindrical wall surfaces being slightly tapered and disposed in facing rotatably sliding relationship whereby said body is supported on said mount,
a cover received on said cover receiver and providing a second chamber, said second opening means in said body communicating with said second chamber and cooperating with said first opening means in said mount to vent gases from said first chamber to said second chamber.

5. The assembly of claim 4 wherein:
said cover receiver means are positioned to accommodate simultaneous turning of said body with said cover to vary the degree of registry of said second opening means with said first opening means.

6. The assembly of claim 4 wherein:
said cover has an outlet thereon for evacuation of said vented gases from said second chamber.

7. The assembly of claim 6 wherein:
said cover receiver means has inlet vent means therein located such that said second opening means in said body are adjacent a flow path from said inlet vent means to said outlet.

* * * * *